US008226462B2

(12) United States Patent
De Bruin et al.

(10) Patent No.: US 8,226,462 B2
(45) Date of Patent: Jul. 24, 2012

(54) METHOD OF AWARDING A PRIZE

(75) Inventors: Andre De Bruin, Dapto (AU); Anthony Phillip Schubert, Camberwell (AU)

(73) Assignee: Golden Casket Lottery Corporation Limited, Woolloongabba, Queensland (AU)

( * ) Notice: Subject to any disclaimer, the term of this patent is extended or adjusted under 35 U.S.C. 154(b) by 1660 days.

(21) Appl. No.: 10/549,075

(22) PCT Filed: Mar. 10, 2004

(86) PCT No.: PCT/AU2004/000294

§ 371 (c)(1),
(2), (4) Date: Oct. 18, 2006

(87) PCT Pub. No.: WO2004/080555

PCT Pub. Date: Sep. 23, 2004

(65) Prior Publication Data

US 2007/0054722 A1 Mar. 8, 2007

(30) Foreign Application Priority Data

Mar. 11, 2003 (AU) ................................ 2003901093

(51) Int. Cl.
*G06F 13/00* (2006.01)

(52) U.S. Cl. ............... 463/16; 463/25; 463/42; 273/292

(58) Field of Classification Search ........................ None
See application file for complete search history.

(56) References Cited

U.S. PATENT DOCUMENTS

| | | | | |
|---|---|---|---|---|
| 6,210,277 | B1 | 4/2001 | Stefan | |
| 2002/0187836 | A1 * | 12/2002 | Meyer | 463/42 |
| 2002/0198044 | A1 * | 12/2002 | Walker et al. | 463/25 |
| 2003/0064807 | A1 | 4/2003 | Walker et al. | |
| 2003/0146574 | A1 * | 8/2003 | Duhamel | 273/292 |

FOREIGN PATENT DOCUMENTS

| | | |
|---|---|---|
| AU | 53370/86 | 8/1986 |
| AU | 199670247 | 4/1997 |
| AU | 199861905 | 4/1998 |
| AU | 199943453 | 12/1999 |
| AU | 199936763 | 1/2000 |
| AU | 199944518 | 3/2000 |
| EP | 1383096 | 1/2004 |
| WO | WO 97/12338 | 4/1997 |
| WO | WO 99/03078 | 1/1999 |
| WO | WO 01/15790 | 3/2001 |

OTHER PUBLICATIONS

International Search Report; PCT/AU2004/000294; May 31, 2004.

* cited by examiner

*Primary Examiner* — Paul A D'Agostino
(74) *Attorney, Agent, or Firm* — The Small Patent Law Group, LLC; Christopher R. Carroll

(57) ABSTRACT

A method of awarding a prize in a network of electronic gaming machines in which the probability of a machine winning the prize is dependent upon a change in a win meter of the electronic gaming machine within a polling cycle.

15 Claims, 8 Drawing Sheets

METHOD OF AWARDING A PRIZE

FIELD OF THE INVENTION

The invention relates to a method of awarding prizes. The invention finds particular application in a network of electronic gaming machines.

BACKGROUND TO THE INVENTION

There are numerous methods of awarding prizes such as raffles, chocolate wheels, lottery tickets, casino games and slot or poker machines. Much of the prior art relating to electronic prize award methods is concerned with electronic gaming machines, particularly those known as poker machines or slot machines.

Electronic gaming machines (EGM) provide game play by accepting a coin or token in exchange for the spin of a number of wheels. Older machines actually have mechanically spinning wheels but modern machines are completely electronic. The 'spinning wheels' are actually a video display that gives the appearance of rotating wheels of various icons. If a predetermined combination of icons align in the window an immediate prize is awarded and credited to the machine.

The electronic machines provide a range of meters for monitoring the machine activity. These meters include at least the following:

Credits-in: A count of the actual number of credits contributed by a player. This is often counted as a number of base denominations. For example, a machine that plays one-dollar coins may count 100 credits per coin although it may display to the player as one credit on that machine. On a machine that plays five-cent credits the credit meter will still count 100 credits although the machine will display 20 credits to the player.

Credits-out: A count of the actual number of credits taken from the machine by a player. If a player reinvests all winnings the credits-out meter will not make a recording. On the other hand, if a player puts in one dollar and then takes the same dollar back out, both meters will read 100 credits.

Strokes: A count of the actual plays made. This meter counts the number of times game play is activated, rather than the actual number of games played. For example, some machines allow multiple lines to be played each game. Whether one line or five lines are played the meter only counts one stroke.

Turnover: A count of the total number of credits that are processed by the machine. If a player reinvests credits that are won during game play the turnover meter will record a number much greater than the credits-in meter. However, if a player always takes won credits from the machine the turnover will equal the credits-in. Most players replay small wins and thus the turnover meter normally records a number greater than the credits-in meter.

Wins: A count of the credits won on the machine during normal game play. Certain combinations of icons are predetermined to be winning combinations. When a game play results in a winning combination an amount of credits is read from a payout table and recorded by the win meter. The machine will normally display the amount of a win until the next game play. The win meter accumulates all wins paid on a machine.

It will be evident that turnover equals credits-in plus wins minus credits-out and is therefore affected by the playing approach of a player. For example, a player who is only interested in collecting large wins may have meter reading changes of: Credits in—20; Strokes—55; Wins—100; Credits out—0; Turnover—120. Another player with the same initial investment and the same luck may have: Credits in—20; Strokes—15; Wins—100; Credits out—80; Turnover—30.

It is evident from the example above that systems that award prizes on the basis of turnover are skewed towards players that leave their winnings in the machine and therefore encourage excessive gambling. Notwithstanding the skewing, or perhaps because of it, systems have been developed to increase patronage in gaming machine establishments that are based on turnover.

One approach has been to award jackpot prizes that are separate from the prizes awarded by each individual machine. Typically, these jackpot prize systems operate across a number of machines linked in a local area or wide area network. A prize is accumulated by adding a small percentage of turnover each game play (or stroke). The accumulating jackpot is displayed to patrons as an incentive to increase play to improve the chance of winning the jackpot. Typically these prizes are significantly greater than any machine based prize.

One of the earliest and most extensively used methods of awarding a jackpot prize for linked gaming machines is the system commonly known in Australia as the Frankovic system or Dauma. It is described in Australian patent number 589158. In a Frankovic system a number of gaming machines are linked to a central jackpot controller. When the jackpot controller is initialised a random number is chosen between a minimum (or reset) value and a maximum value. Each time a machine on the link is played it generates a signal which is counted until the incremental count reaches the random number. The machine that increments the count to the random number wins the prize. Frankovic is a 'first past the post' system and is considered to be deterministic because the probability of a prize being awarded increases as the count approaches the upper limit.

Soon after the introduction of the Frankovic system a system known generically as Hyperlink was introduced by Aristocrat Technologies Australia Pty Ltd. The Hyperlink system is described in a number of patent applications but International patent application number PCT/AU98/00525 is representative. In the Hyperlink system a jackpot prize is awarded when a trigger condition is satisfied. The trigger condition is dependent upon the number of credits bet per game on a gaming machine.

The Neurizon system (known in the market in one embodiment as PowerCash) is described in Australian patent number 714299. The Neurizon system is a method of awarding a jackpot prize where the probability of an electronic gaming machine being awarded the prize is dependent upon the amount of turnover on the machine in a preceding period of time, rather than on individual games.

A system known in the market as Megagold is described n International patent application number PCT/AU00/01011. The Megagold system uses a three step process to award a jackpot prize. In the first step a decision is made whether to award a prize or not during a poll cycle. The decision is random but may be conditioned by the total amount of turnover by all linked machines during the poll cycle. If a decision is made to award a prize a process is followed to select a venue in which the probability of a venue being selected is proportional to the amount of turnover at a venue relative to the turnover at all venues in the poll cycle. Once a venue is selected a similar process is followed to select a winning machine in which the probability of a machine being selected is proportional to the amount of turnover on that machine relative to the turnover on all machines at the venue in the poll cycle.

The first two systems described above are considered to be deterministic whereas the latter two are considered to be non-deterministic. A non-deterministic prize award system is one in which the triggering of a prize award is not dependent on a previous event, and in which the probability of winning a prize does not increase over time.

All of the known prize award systems, whether for wide area or local area network applications, are based on turnover per game played or turnover in a given period of time. No alternatives exist or have been suggested.

DISCLOSURE OF THE INVENTION

In one form, although it need not be the only or indeed the broadest form, the invention resides in a method of awarding a prize to a user of an electronic gaming machine in a network of electronic gaming machines where the probability of each electronic gaming machine winning the prize is dependent upon a change in a win meter of the electronic gaming machine over a polling cycle.

The polling cycle is suitably as short as possible while allowing time to collect all required data and perform all required calculations. Typically the polling cycle will be between one and ten seconds.

In a further form the invention resides in a method of awarding a prize to a user of an electronic gaming machine in a network of venues of electronic gaming machines, there being a network of multiple electronic gaming machines at each venue, including the steps of:

a. randomly determining whether to award a prize;

b. randomly selecting a winning venue for award of the prize;

c. randomly selecting a winning electronic gaming machine at the winning venue; and d. awarding the prize to the winning electronic gaming machine; wherein the probability of each electronic gaming machine winning the prize is dependent upon a change in a win meter of the electronic transaction machine over a polling cycle.

Preferably the step of randomly determining whether to award a prize includes the steps of:

i) generating a random number;

ii) comparing the random number to a prize hit value; and iii) deciding to award the prize if the random number matches the prize hit value.

The random number is preferably selected from within a range inversely proportional to the total accumulated change in win meter across all electronic gaming machines in the network of electronic gaming machines over the polling cycle.

Preferably the step of randomly selecting a winning venue for award of the prize includes the steps of:

iv) randomly determining a venue hit number from within a range equal to the total accumulated change in win meter across all electronic gaming machines in the network over a polling cycle;

v) adding together a total increase in win meter from each venue over a poll cycle until addition of the change in win meter from a particular venue results in the venue hit number being equalled or exceeded.

Preferably the step of randomly selecting a winning electronic gaming machine at the winning venue includes the steps of:

vi) randomly determining an electronic gaming machine hit number from within a range equal to the total accumulated change in win meter across all electronic gaming machines at the winning venue over a polling cycle;

vii) adding together a total increase in win meter from each electronic gaming machine at the winning venue over a poll cycle until addition of the change in win meter from a particular electronic gaming machine results in the electronic gaming machine hit number being equalled or exceeded.

The prize may conveniently be accumulated each cycle as a percentage of the total change in all win meters across the network over the polling cycle.

All steps of the method are suitably conducted at a central prize controller in signal communication with the venues.

There may suitably be one or more venue controllers associated with each venue.

In a further form the invention resides in a system for awarding prizes in a linked network of electronic gaming machines, the system comprising:

a central prize controller;

a plurality of electronic gaming machines; and a communications network linking said central prize controller to said electronic gaming machines;

wherein the central prize controller includes a processor that performs the steps of:

a. randomly determining whether to award a prize;

b. randomly selecting a winning venue for award of the prize;

c. randomly selecting a winning electronic gaming machine at the winning venue; and d. awarding the prize to the winning electronic gaming machine;

wherein the probability of each electronic gaming machine winning the prize is dependent upon a change in a win meter of the electronic gaming machine over a polling cycle.

The electronic gaming machines may be arranged into one or more venues and there may be one or more venue controllers associated with each venue. Suitably the electronic gaming machines at a venue are linked in a local area network and the venue controllers are linked to the central prize controller in a wide area network.

BRIEF DESCRIPTION OF THE DRAWINGS

To assist in understanding the invention, preferred embodiments will be described with reference to the following figures in which.

DETAILED DESCRIPTION OF THE DRAWINGS

Figure 1:
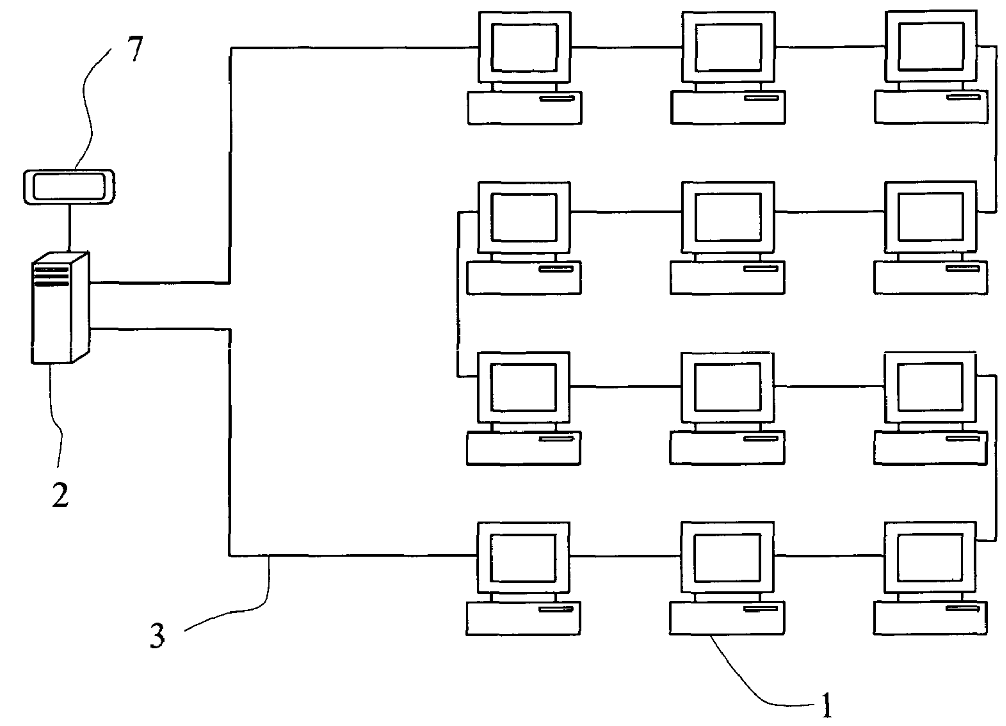
FIG. 1 is a block diagram of a first embodiment of a prize awarding system.

Referring to FIG. 1, there is shown a schematic layout of a system suitable for working the invention. In the embodiment shown there are twelve electronic gaming machines (EGMs)

1 connected to a central prize controller (CPC) 2 in a network 3. This embodiment is applicable to a wide area network of electronic gaming machines (EGMs) that are all connected directly into the network. It is also applicable to a local area network of electronic gaming machines at a single venue.

Figure 2:
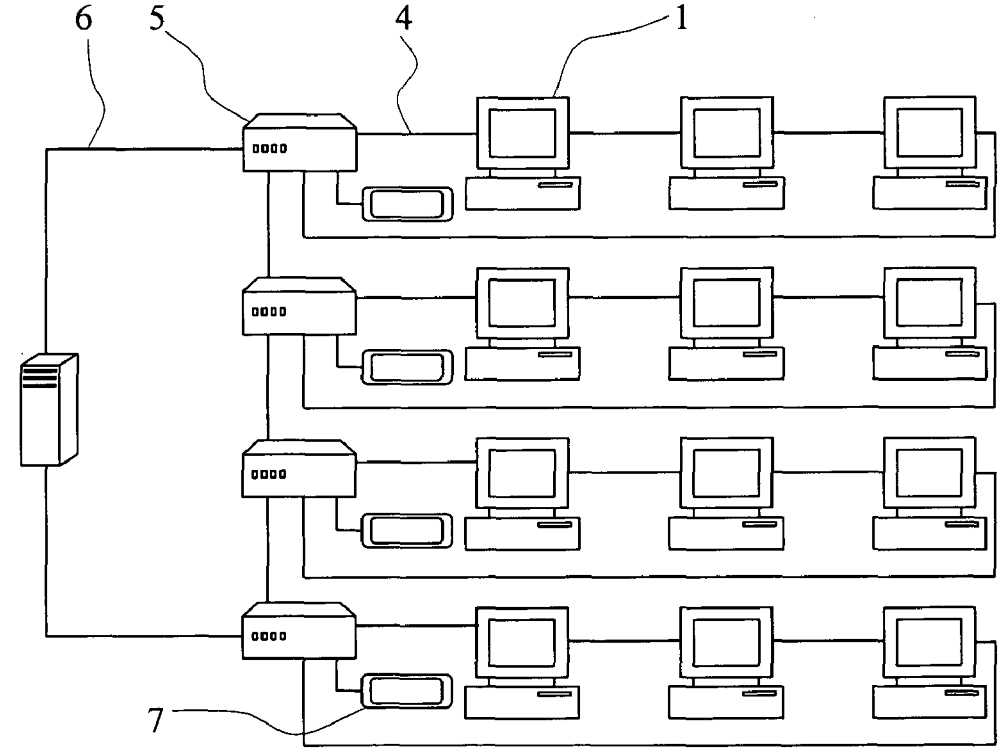
FIG. 2 is a block diagram of a second embodiment of a prize awarding system.

For wide area applications it will be more convenient to configure EGMs into local area networks 4 that are grouped at a single venue, as shown in FIG. 2. A venue controller (VC) 5 provides an interface between the local area network 4 and the CPC in a wide area network 6.

Various display devices 7 may be provided to advise players of the current available prize. As described below, a prize may be an item (such as a car or a holiday), a fixed dollar amount, or a progressive prize of the type known in the prior art. It is preferable that sufficient display devices are employed that every player who has a chance of winning a prize is able to see a display that shows the prize on offer. For clarity, only one display device has been shown at each venue in FIG. 2. The display devices are conveniently driven from the VC. For the embodiment of FIG. 1 only a single display device is shown but it will be appreciated that numerous display devices may be scattered throughout the network.

The CPC 2 is the controller at the centre of the prize awarding system. All significant steps of the prize awarding system are conducted by the CPC, and only by the CPC. This ensures the integrity of the system and prevents multiple prizes from being awarded per polling cycle, as will become clear in later description. The VCs provide local housekeeping functions such as monitoring machine operation, controlling displays and managing communication. There can be more than one VC at a venue.

Figure 3:
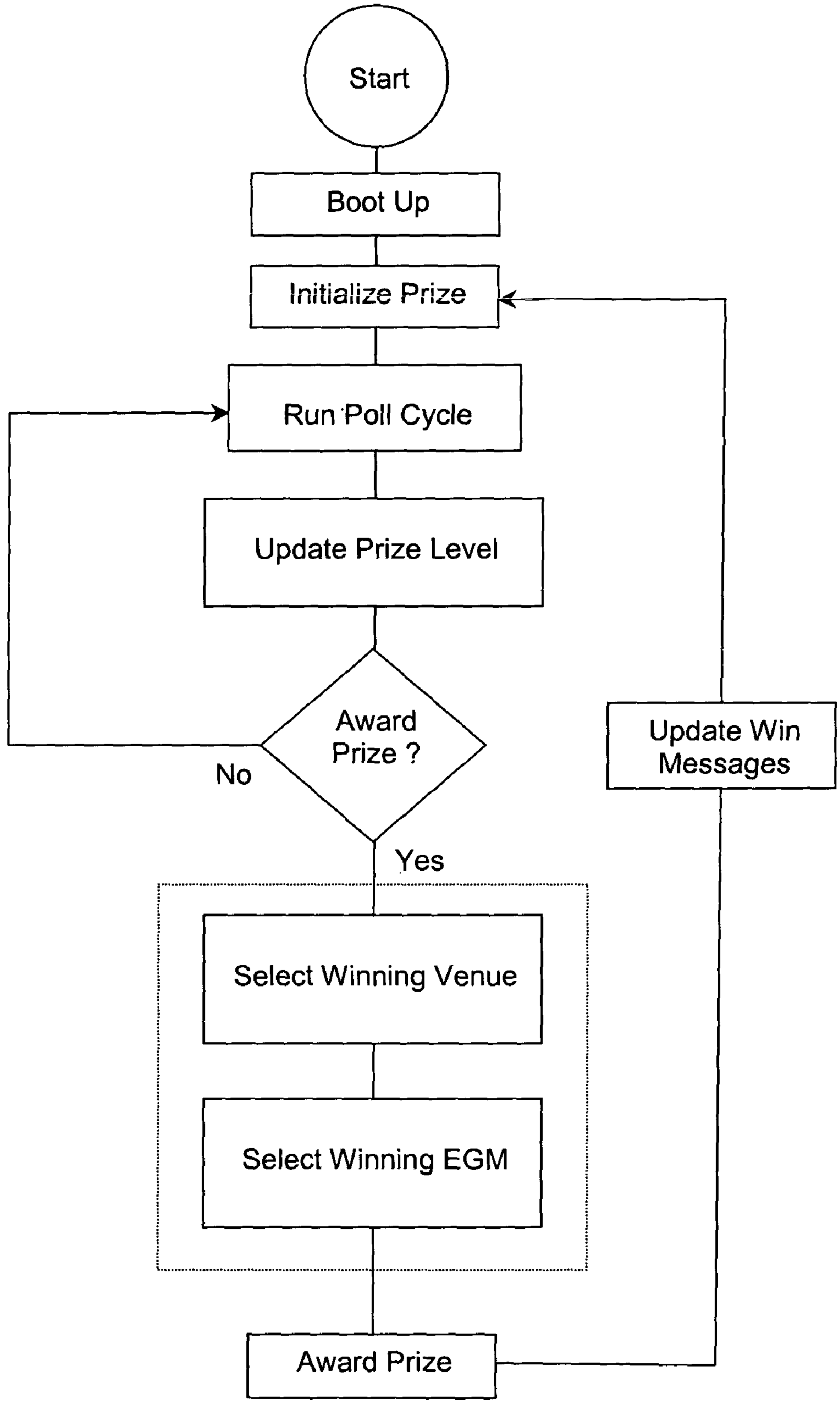
FIG. 3 is a flowchart of the steps of one embodiment.

The following description will focus on the particular application of the prize award system to a network of EGMs by reference to the overview flow chart of FIG. 3. The flow charts of FIG 4 to FIG. 7 provide more detail of key aspects. The process depicted in FIG. 3 is performed by the CPC. The process is started and a boot routine performs normal checks and sets variables to commencing values.

A starting value for a prize is established when the prize award system is initialised. The prize may be a fixed value item, like a car or holiday, or an incrementing value. Typically an incrementing prize is increased by adding a small percentage of accumulated transaction value to the prize each cycle.

Figure 4:
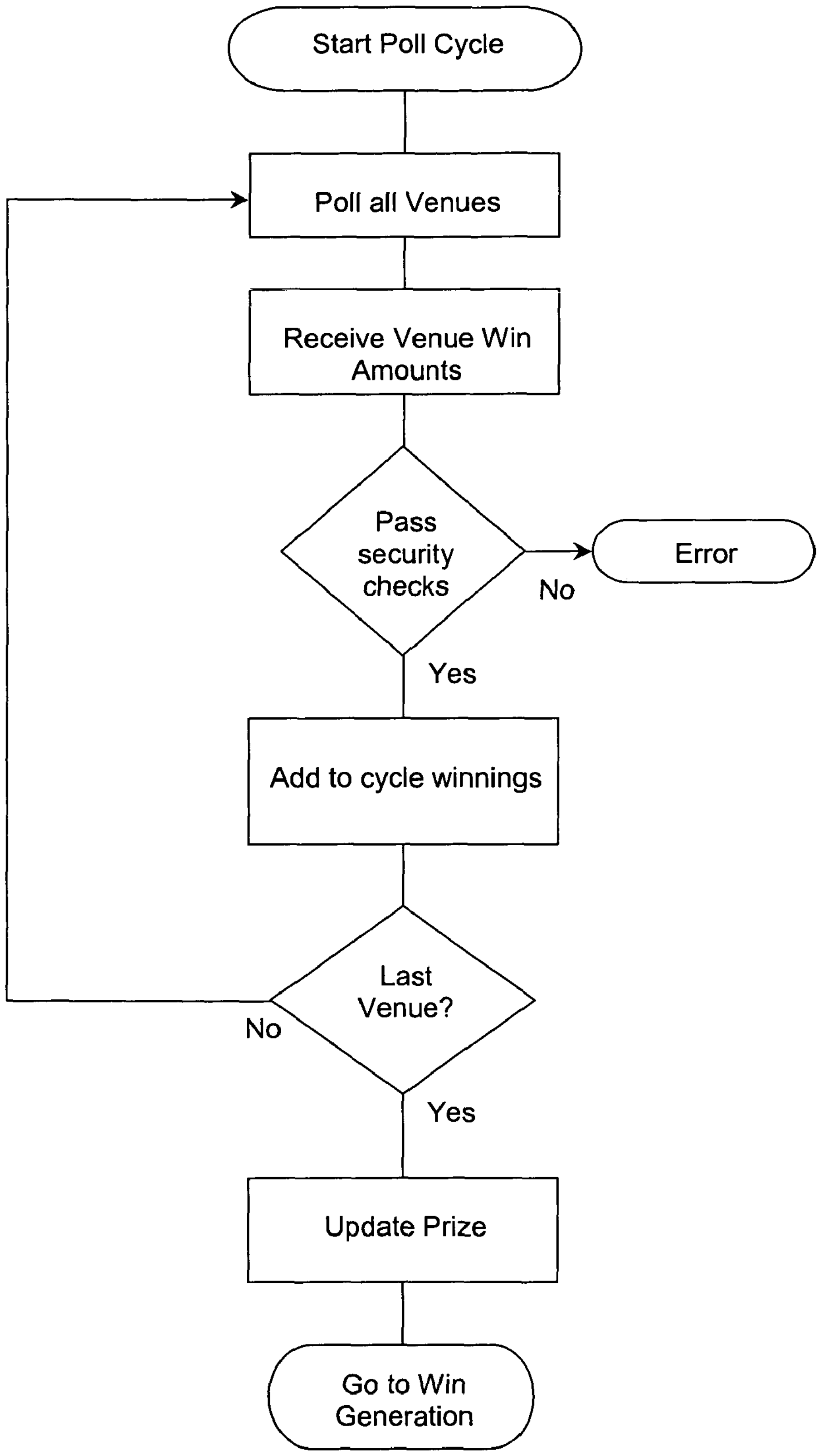
FIG. 4 is a timing diagram of a polling cycle.
Figure 5:
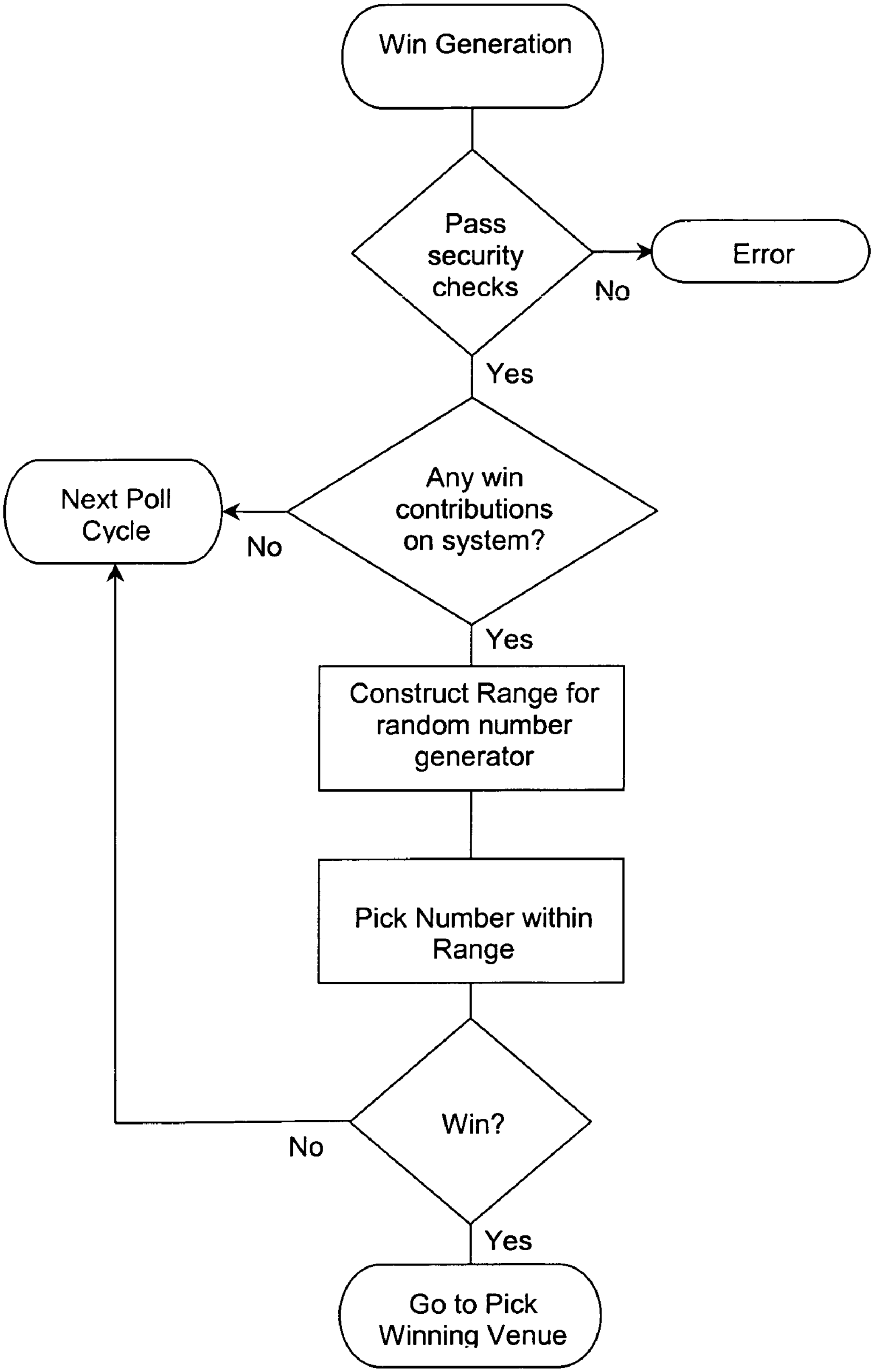
FIG. 5 illustrates the steps during a polling cycle.
Figure 6:
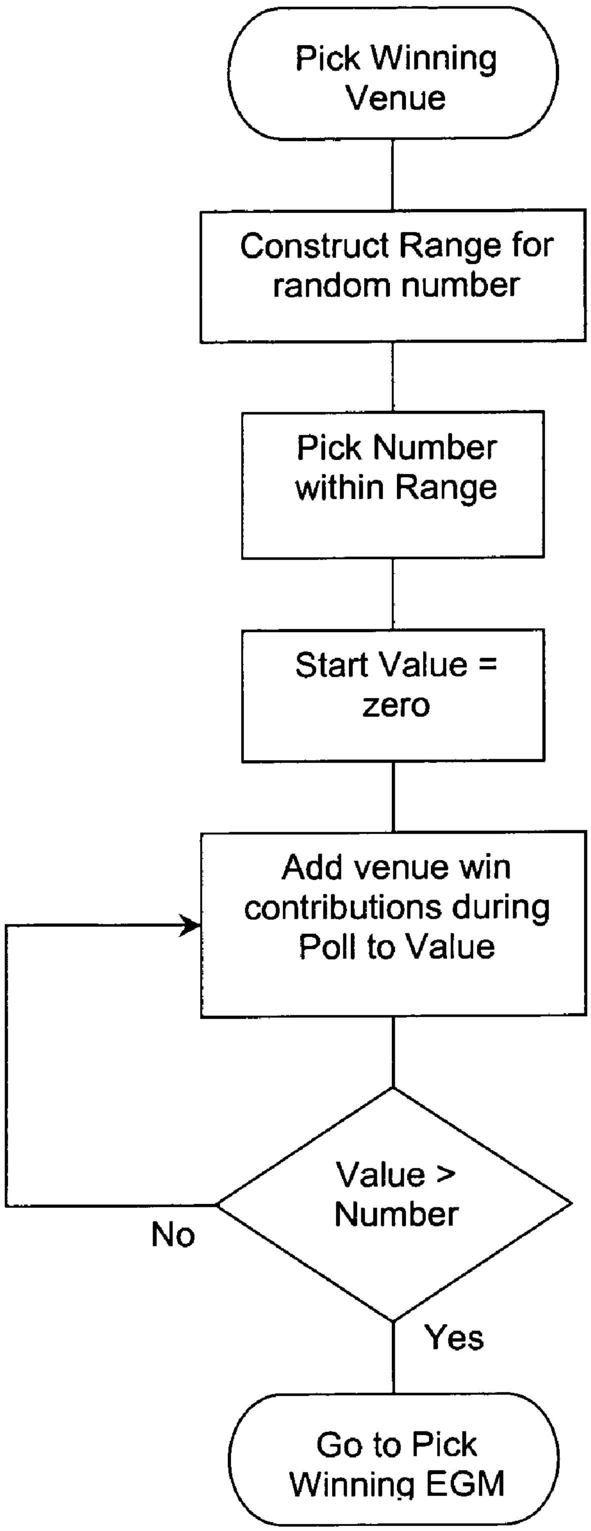
FIG. 6 is a flowchart showing a prize accumulation process.
Figure 7:
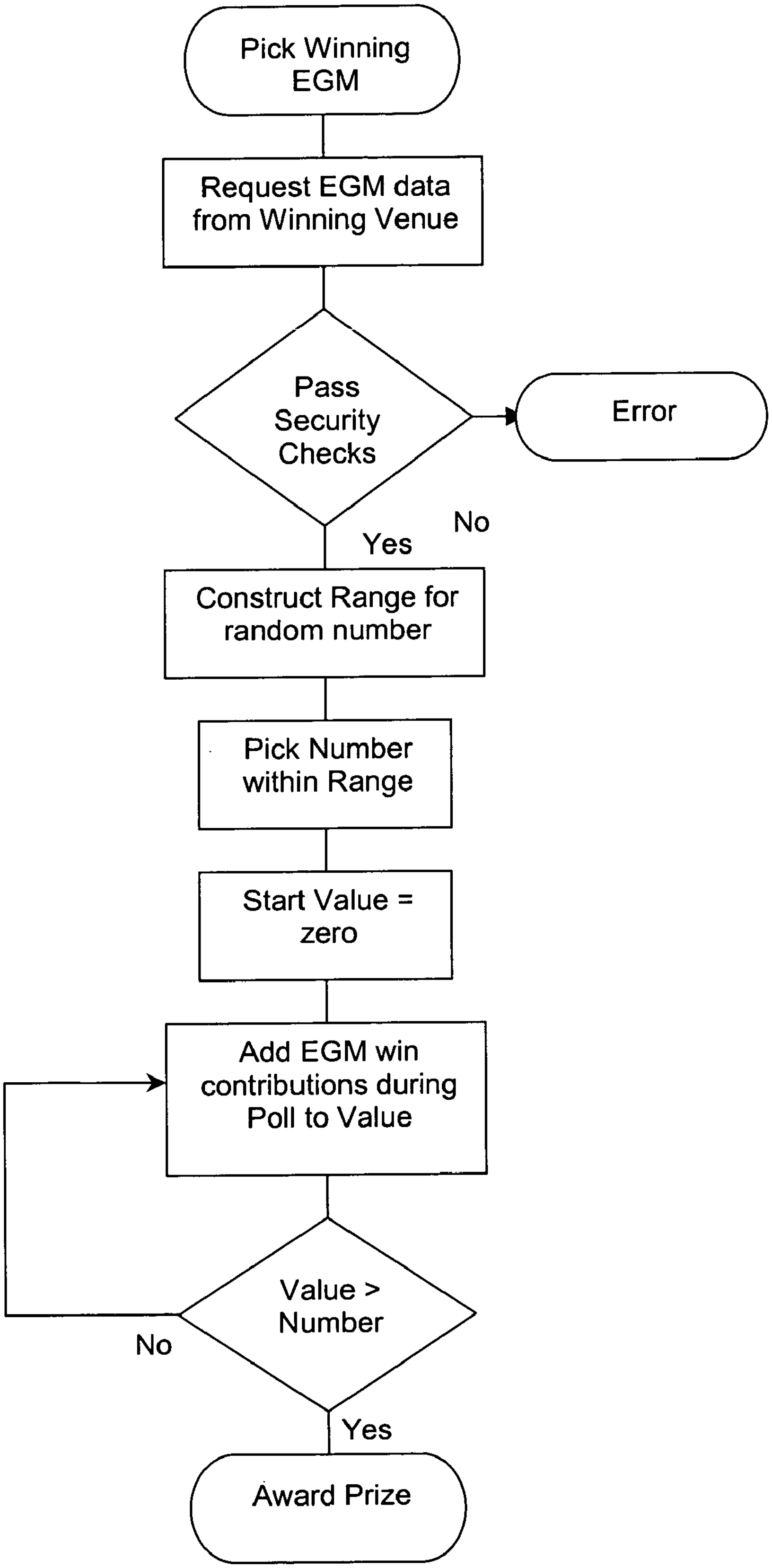
FIG. 7 is a flowchart illustrating a process of selecting a winning electronic gaming machine in one embodiment.

A polling cycle is established by a timer in the CPC. Each cycle all venues are polled to obtain the current win meter values. These values are checked to ensure that the meter is equal to or more than the previous reading and that the increase is not larger than a reasonable number. If the security checks fail the system enters an error handling mode. The winnings from all venues are added to obtain the actual cycle winnings for that poll. If an incrementing prize is implemented, the prize level is incremented from a small percentage of the actual cycle winnings in the cycle. This part of the process is shown in FIG. 4.

The next step of the preferred method is to establish whether to award a prize during the current cycle. This step is shown in the flow chart of FIG. 5. After suitable security checks a check is made for any win contributions during the cycle. If there have been no wins during the cycle the system waits for the next poll cycle and recommences the process. If there have been wins on the system a range is established for a random number and a random number is selected within the range. It is convenient for the range to be inversely proportional to the actual cycle winnings over the polling cycle. This is the total of the increase in win meter from all machines on the network during the poll cycle. If the selected number matches a hit number (which is conveniently one) a prize will be awarded. If not, the test will be conducted in the next polling cycle.

The range for the random number is calculated from predetermined parameters that set the approximate frequency at which a prize will be awarded.

The next part of the method is to identify the machine to be awarded the prize. This is conveniently done in two parts. First a winning venue is selected according to the process shown in FIG. 6 and then a winning EGM is selected at the winning venue according to the process of FIG. 7. It will be appreciated that all machines could be connected on a single link and processed in a single cycle (as shown by the broken line in FIG. 3). Nonetheless, the inventors have found that there are processing advantages in performing the selection process in the two steps shown.

To select a winning venue a random number is selected within a range equal to the total of the increase in win meter from all venues on the network during the poll cycle. The total increase in win meter from each venue is added in a predetermined order until the random number is equalled or exceeded. The venue responsible for equalling or exceeding the random number is the winning venue. It will be appreciated that by this process a venue must be selected once a decision is made to award a prize. Of course, venues that have not had any change in win meter on any machine do not have any chance of being awarded a prize and are not processed.

To select a winning EGM a random number is selected within a range equal to the total of the increase in win meter from all EGMs on the network at the venue during the poll cycle. The total increase in win meter from each EGM is added in a predetermined order until the random number is equalled or exceeded. The EGM responsible for equalling or exceeding the random number is the winning EGM. The prize is awarded to the winning EGM and various win messages are displayed at the machine and the venues. Only EGMs that have recorded a change in win meter in the poll cycle are considered for award of the prize. All other EGMs are excluded from processing.

The process may then be repeated by resetting the prize, usually to a small seed value, and following the process of FIG. 3. It should be noted that the steps of selecting the venue and selecting the EGM only occur if it is determined in the first step that a prize should be awarded.

To assist in understanding the method a specific example using the win meter and a six second poll cycle will be described. This method ensures that to have a chance of winning a prize a player must have played the EGM during that poll cycle and then the probability of a win depends on the accumulated amount won during that poll cycle. Therefore EGMs with no winning combination during that poll cycle are ruled out as part of the selection process, irrespective of the level of turnover.

The implementation provides multiple levels of prizes however each prize level operates the same way, only the values are different. Up to 3360 EGMs are linked across a network of up to 140 venues. It works on a six-second poll cycle with the Central Prize Controller (CPC) controlling all functions and timing.

Although the implementation is capable of multiple prize levels, only one prize level will be discussed here for simplicity. With multiple prize levels the functions are the same and all prize levels are calculated simultaneously.

At the start of a normal six-second poll cycle the CPC performs a general poll of all 140 venues and receives back from all venues the accumulated winnings at that Venue and an EGM CRC verification number. The CRC is a security protocol commonly implemented in gaming machine networks. It does not form part of the invention.

The Venue winnings are cumulative and roll over at 4,294,967,295 (for a 32 bit implementation). The EGM CRC Verification number is a number arrived at by calculating a CRC across the six-second winnings of each EGM at that venue. e.g. If there were three EGMs at the Venue and they had six second machine winnings for this poll of $3.00, $2.00, and $2.50 respectively, the EGM CRC verification number is calculated by running a CRC across the $3.00 then continuing across the $2.00 and continuing across the $2.50. The resultant number is the EGM CRC verification number, which is sent every poll cycle but used only during the prize verification process.

The CPC then checks the accumulated winnings of each venue for that poll by verifying that the amount sent by the venue does not exceed a realistic value.
E.g. if a venue misses one poll cycle, and if this check was not performed, the venue accumulated winnings could be an amount played during 12 seconds (two poll cycles), this would be unrealistic. However since the CPC "knows" that the VC missed one poll it will allow this amount. Also, if there was tampering on the venue side to try and simulate a very large win in order to be favoured during a prize picking process the unrealistic amount would be identified and the system would shut down.

Each venue accumulated winnings, which passes this verification, is added to form a new value known as the Actual Cycle Winnings (ACW). When all venues have been polled and the actual cycle winnings created, a percentage of the winnings contributed is calculated and added to the current Prize amount. All Prize data is then backed up to NVRAM and a CRC is built across the prize data. Once all prize levels are done, the system determines "range".

Range is effectively the chance of winning during that poll cycle and is inversely proportional to the Actual Cycle Winnings during that poll. i.e. The greater the amount of the payouts during the poll the smaller the Range number and hence the greater the chance of winning a prize.

The Random Number Generator uses the Range number as its range and picks a number. If the number is equal to the hit number a prize is awarded. The hit number is selected to be one. One is chosen because the range for the random number generator scales with the actual cycle winnings. Although unlikely, it is possible for the ACW to be very large so that the range becomes small. The minimum possible range is one, in which case a prize will always be awarded.

Range is calculated using preset constants as the prize system parameters. These are System Range and Expected Winnings Contributed (EWC). System Range is a number, which determines the overall (probable) frequency at which a prize level will trigger and EWC is the Expected Winnings Contributed to the prize each poll. These constants are determined at commissioning of the prize award system and are based on historical data. These parameters can be adjusted.

These two figures are used to calculate Range such that Range=System Range×EWC/ACW.

Once all prize levels are processed, and there is a prize hit, the winning venue is picked.

To pick a winning venue, the actual cycle winnings are used as the range for a random number generator and a number is picked. This is the venue-hit number. The cycle winnings from each venue are then added (starting at venue one) and the venue, which equals or exceeds the venue-hit number, is the winning venue.
E.g. Let's say there are three venues (for the purpose of explanation disregard how many EGMs each has for the moment) and they each have a venue cycle winnings as follows. Venue one has $9.00, venue two $3.00 and venue three $4.00 during that poll. That gives an actual cycle winnings of $16.00. The RNG picks a number in a range from 1 c to $16.00 and this number becomes the venue hit number. Let's say it is $10.00. The system now adds the cycle winnings from each venue starting at venue one. Starting with a value of zero, we add in venue one and we have $9.00 this does not equal or exceed $10.00 (the venue hit number) so we add in venue two. We now have $9.00 plus $3.00, which equals $12.00. This exceeds $10.00 and venue two is therefore the winning venue.

Once all winning venues have been allocated winning prize levels, the venues are polled (still within the six second poll) to request EGM data for picking a winning EGM at the venue.

The winning venue provides an EGM data response with the six-second winnings from each EGM (starting at EGM one). The CPC then runs a CRC over these values and verifies it with the EGM CRC verification number, which it received during the general poll response. If this verification fails, the whole system is shut down because it indicates a possible tampering with the prize. If this verification passes, the system continues with picking the winning EGM.

The picking of the winning EGM is performed in the same way as with the picking of the winning venue. The venues contributed winnings are used as a range for the RNG and the RNG picks a number, called the EGM hit number. The winnings from each EGM (during that poll cycle) is then added (starting at EGM one) and the EGM that equals or exceeds the EGM hit number is the winning EGM.
E.g. Let's say there are three EGMs and they have EGM payouts as follows. EGM one has $3.00, EGM two $2.00 and EGM three $2.00 during that poll. That gives a Venue contributed winnings of $7.00. The RNG picks a number in a range from 1 c to $7.00 and this number becomes the EGM hit number. Let's say it is $5.00. The system now adds the winnings from each EGM starting at EGM one. Starting with a value of zero, add in EGM one of $3.00, this does not equal or exceed $5.00 (the EGM hit number) so add in EGM two. Now $3.00 plus $2.00, equals $5.00. This equals $5.00 and EGM two is therefore the winning EGM.

A WIN message is sent to the winning VC. The current prize parameters are reset with the pending prize parameters. The WIN message is sent to all other online venues and the next poll cycle starts with the general poll.

The probability of any particular EGM winning a prize can be calculated by:

$$P_{EGM} = \frac{EGM \text{ winnings}}{\text{venue winnings}} * \frac{\text{venue winnings}}{\text{total winnings}} * \frac{\text{total winnings}}{\text{actual winnings contributed}}$$

Cancelling terms above and below the vinculum gives the equation:

$$P_{EGM} = \frac{EGM \text{ winnings}}{\text{actual winnings contributed}}$$

Therefore, the probability of each EGM winning a prize on the system is related to the amount won from winning combinations on the EGM during the poll cycle. As explained above, this is a different outcome from prior art methods that are based on turnover.

Figure 8:
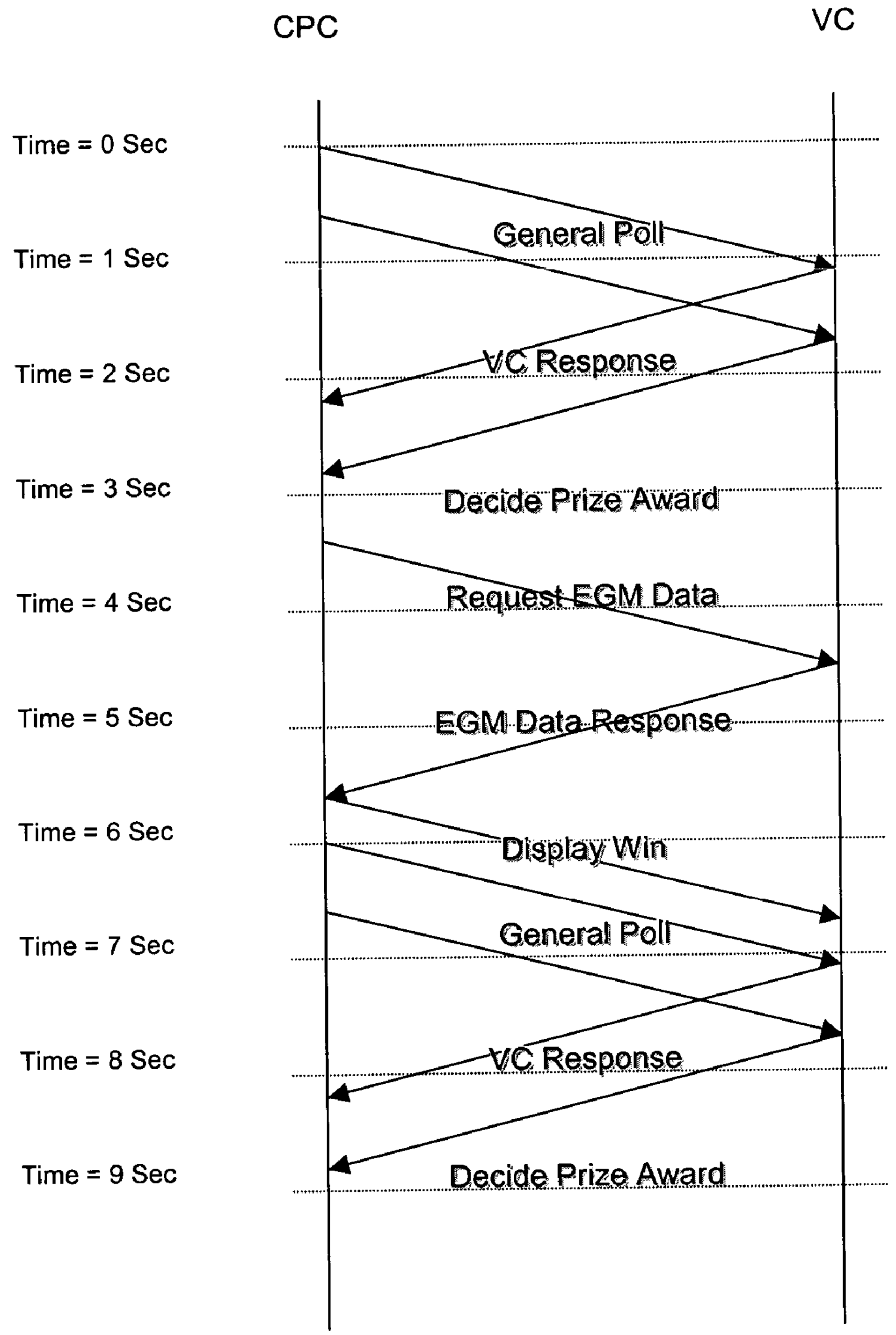
FIG. 8 illustrates network data flow during a polling cycle in one embodiment.

All required data collection and data processing occurs in the polling cycle. One example of network data flow to achieve a six second poll cycle is shown in FIG. 8.

The communication commences with a general poll by the CPC to each VC. The poll signal duration is about 620 msec and it takes about 3 sec for all VC's to respond. After all data is received (by about 3.62 sec) the prize award calculation is performed. It takes approximately 20 msec to perform this calculation. If there is a decision to award no prize there is general housekeeping and then the system awaits the next poll which commences at 6 sec.

If the decision is to award a prize the CPC issues a "Win Pending" message which is displayed at all venues. The CPC determines the winning venue then requests EGM data from the selected venue. A "Winning Venue" signal may be sent to the selected venue, and possibly other venues. The system then determines the winning machine by requesting EGM data from the selected venue and selecting the winning EGM. A "Winning EGM" signal is sent to all venues and to the selected EGM. Each venue and the winning EGM must acknowledge the win signal or the prize is not awarded and another attempt to award the prize to the winning EGM is made. The prize is reset and the process recommences.

It is possible that when there is win to award the processing may extend beyond six seconds. In this case the VC continues to collect data and the CPC catches up on the next poll cycle in which no prize is awarded.

The poll cycle is a key aspect of the operation of the method of awarding a prize. A 6-second poll cycle has been shown by the inventors to be appropriate for current processor technology. For smaller networks or faster processors a shorter poll cycle will be possible. At present, a poll cycle between 1 second and 10 seconds is suitable for most situations.

As mentioned above, all venues are polled to obtain the change in win meter since the last poll. At the start of the poll cycle all venues are requested in a general poll to supply the value of the win meter. Each value is tested to ensure that it is not less than the previous received value. If the new win meter value is less than the old win meter value there is an error condition and the system is suspended while error handling routines are performed.

If the new win meter value is greater than or equal to the old win meter value the value is checked to ensure that it is not greater than a maximum anticipated value. Once again the system is suspended for error processing routines if this condition is not met. Providing both error check conditions are satisfied the new win meter value is recorded and the difference from the old win meter reading is added to the actual cycle winnings.

The process is repeated for all venues until the last venue is reached.

An identical process is followed for the EGMs at a winning venue. It will be appreciated that the same process could be applied directly to the EGMs in a small network or to a large network if network latencies are sufficiently small to allow all processing to occur in a reasonable time.

Figure 9:
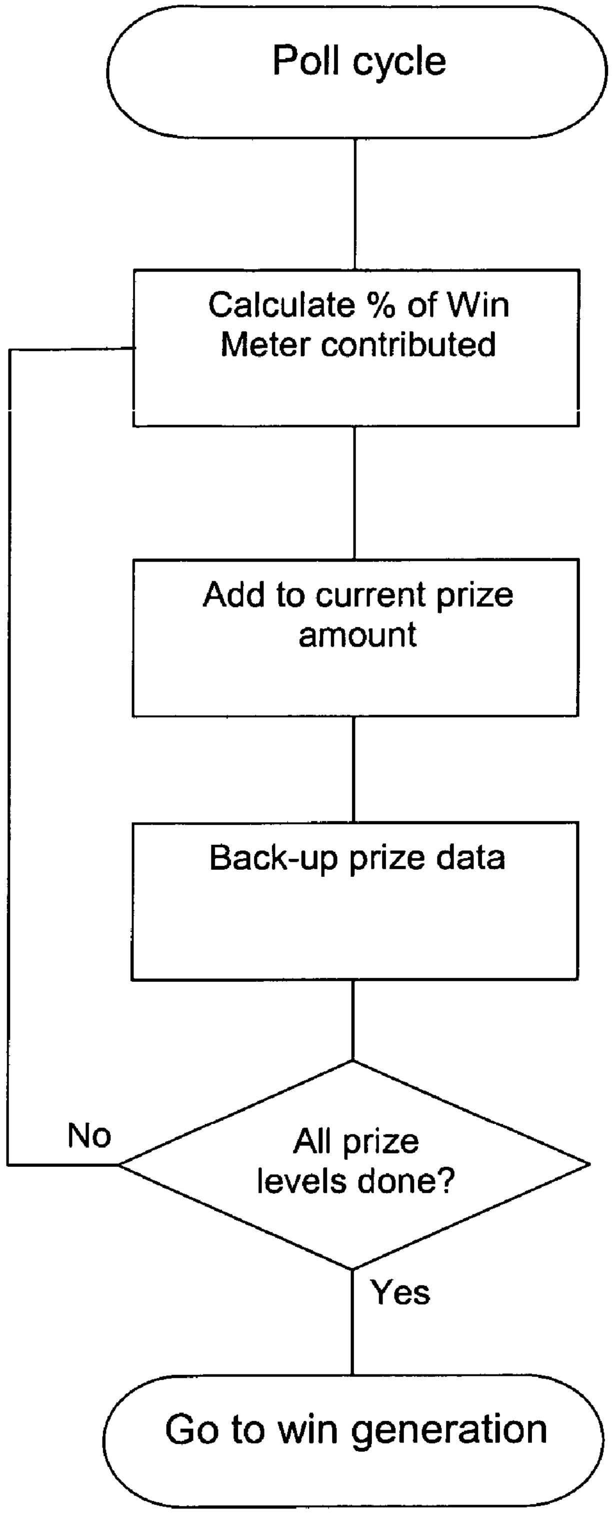
FIG. 9 is a flowchart illustrating a process of updating a prize amount in one embodiment.

The process for updating the prize amount is shown in FIG. 9. As mentioned earlier, the prize may be an incrementing amount that adds a small percentage of the change in the total of the accumulated win meter from all machines in a poll cycle. This process may occur as part of the processing in the CPC or it may be independent. The flowchart of FIG. 9 shows the process where there are multiple prize levels.

Persons skilled in the art will appreciate that the invention is a significant departure from the prize awarding methods described in the prior art. The prior art systems rely upon turnover to determine prize awards. The present invention does not use the turnover as the basis for the prize award method, instead it uses changes in the win meter.

Throughout the specification the aim has been describe the invention and a preferred embodiment. It is envisaged that the invention may be applied beyond the specific embodiments described without departing from the scope of the invention.

The invention claimed is:

1. A method of awarding a prize to a user of an electronic gaming machine in a first network of venues of electronic gaming machines, there being a second network of multiple electronic gaming machines at one or more of the venues, the method comprising:

determining whether to award the prize;

selecting a winning venue from the one or more venues for award of the prize, wherein selecting the winning venue includes:

determining a venue hit number from within a range based on a venue accumulated change in a plurality of the win meters associated with a plurality of the electronic gaming machines over the polling cycle; and summing increases in one or more of win meters associated with one or more of the venues over the polling cycle until addition of the increases results in the venue hit number being equaled or exceeded by a summed total of the increases, wherein the venue that is associated with the increase in the win meter that causes the summed total to equal or exceed the venue hit number is identified as the winning venue; and selecting a winning electronic gaming machine at the winning venue to receive the prize;

wherein a probability of one or more of the electronic gaming machines winning the prize is dependent upon a change in the win meter of the one or more electronic gaming machines over a polling cycle.

2. The method of claim 1 wherein determining whether to award the prize includes generating a random number; comparing the random number to a prize hit value; and deciding to award the prize if the random number matches the prize hit value.

3. The method of claim 1 wherein selecting the winning electronic gaming machine includes:

determining an electronic gaming machine hit number from within a range based on an accumulated change in the win meters associated with a plurality of the electronic gaming machines at the winning venue over the polling cycle; and summing increases in one or more of the win meters associated with one or more of the electronic gaming machines at the winning venue over the polling cycle until addition of the increases results in the electronic gaming machine hit number being equaled or exceeded by a summed total of the increases, wherein the electronic gaming machine that is associated with the increase in the win meter that causes the summed total to equal or exceed the electronic gaming machine hit number is identified as the winning electronic gaming machine.

4. The method of claim 1 wherein the prize has a value that is at least one of randomly determined or that increases by a percentage of a sum of the changes in a plurality of the win meters over the polling cycle.

5. A method of awarding a prize to a user of an electronic gaming machine in a first network of venues of electronic gaming machines, there being a second network of multiple electronic gaming machines at one or more of the venues, the method comprising:

determining whether to award a prize by generating a random number; comparing the random number to a prize hit value; and deciding to award the prize if the random number matches the prize hit value;

selecting a winning venue for award of the prize by determining a venue hit number from within a first range that is based on a network accumulated change in plural win meters associated with a plurality of the electronic gaming machines at a plurality of the venues over a polling cycle, the network accumulated change in the win meters based on an amount of credits won on the electronic gaming machines at the plurality of the venues during the polling cycle; and summing increases in the win meters of the electronic gaming machines at the plurality of the venues over the polling cycle until addition of the increases of the win meters results in the venue hit number being equaled or exceeded by a network summed total of the increases, wherein the venue that is associated with the increase in the win meter that causes the network summed total to equal or exceed the venue hit number is identified as the winning venue;

selecting a winning electronic gaming machine at the winning venue by determining an electronic gaming machine hit number from within a second range that is based on a venue accumulated change in the win meters associated with one or more of the electronic gaming machines at the winning venue over the polling cycle; and summing increases in the win meters of the one or more of the electronic gaming machines at the winning venue over the polling cycle until addition of the increases of the win meters results in the electronic gaming machine hit number being equaled or exceeded by a venue summed total of the increases, wherein the electronic gaming machine that is associated with the increase in the win meter that causes the venue summed total to equal or exceed the electronic gaming machine hit number is identified as the winning electronic gaming machine.

6. The method of claim 1, wherein the probability of the one or more of the electronic gaming machines winning the prize during the polling cycle is zero if the one or more of the electronic gaming machines have no wins during the polling cycle.

7. The method of claim 1, wherein the probability of the one or more of the electronic gaming machines being selected as the winning electronic gaming machine is independent of an amount of turnover of the one or more electronic gaming machines during the polling cycle.

8. The method of claim 1, wherein the change in the win meter reflects an amount of credits won using the one or more of the electronic gaming machines during the polling cycle.

9. The method of claim 1, wherein the increases in the one or more of the win meters are summed in a sequential order until addition of the increases in the sequential order results in the venue hit number being equaled or exceeded by the summed total of the increases.

10. The method of claim 3, wherein the increases in the one or more of the win meters are summed in a sequential order until addition of the increases in the sequential order results in the electronic gaming machine hit number being equaled or exceeded by a summed total of the increases.

11. The method of claim 5, wherein at least one of the network accumulated change in the win meters or the venue accumulated change in the win meters is independent of an amount of turnover of the one or more electronic gaming machines during the polling cycle.

12. The method of claim 5, wherein at least one of the network accumulated change in the win meters or the venue accumulated change in the win meters reflects an amount of credits won using the one or more of the electronic gaming machines during the polling cycle.

13. The method of claim 5, wherein the increases in the win meters of the electronic gaming machines at the plurality of the venues are summed in a sequential order until addition of the increases of the win meters in the sequential order results in the venue hit number being equaled or exceeded by the network summed total of the increases.

14. The method of claim 5, wherein the increases in the win meters of the one or more of the electronic gaming machines at the winning venue are summed in a second sequential order until addition of the increases of the win meters in the second sequential order results in the electronic gaming machine hit number being equaled or exceeded by the venue summed total of the increases.

15. The method of claim 2 wherein the random number is selected from within a range that is inversely proportional to a venue accumulated change in the win meter across a plurality of the electronic gaming machines over the polling cycle.

* * * * *